Oct. 3, 1933.                A. HUND                1,929,067
                        FREQUENCY MULTIPLIER
                        Filed Nov. 22, 1930
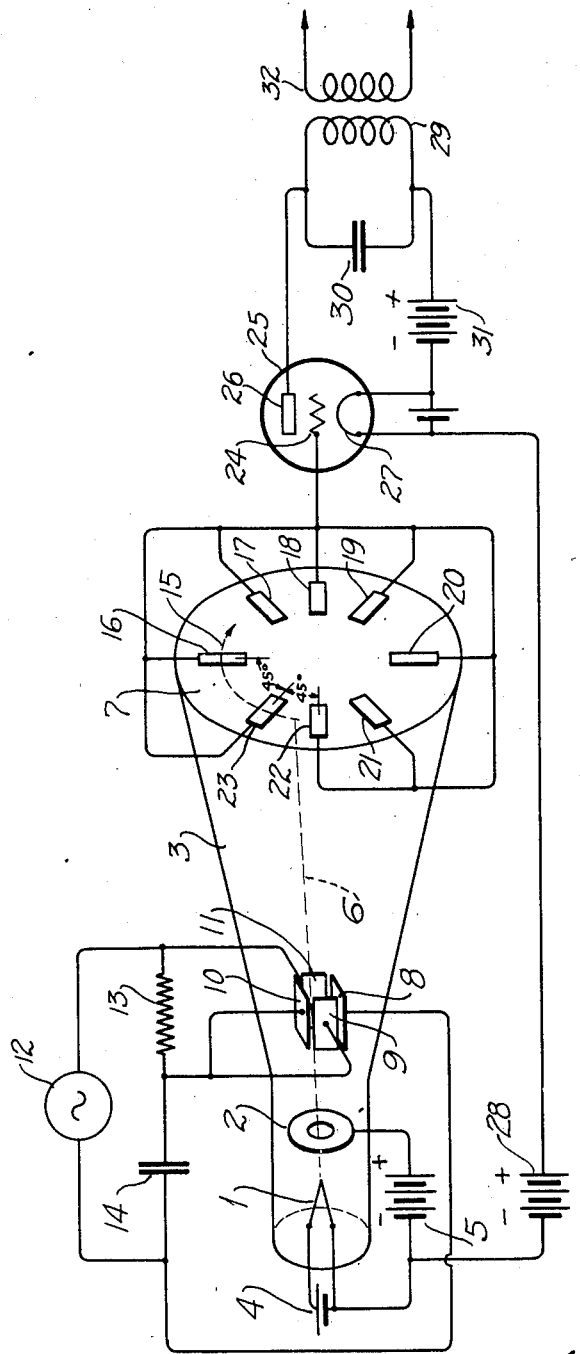
INVENTOR
August Hund
BY
Wm. J. Herdman
ATTORNEY Patented Oct. 3, 1933

1,929,067

UNITED STATES PATENT OFFICE 1,929,067

FREQUENCY MULTIPLIER

August Hund, West Orange, N. J., assignor to Wired Radio, Inc., New York, N. Y., a corporation of Delaware Application November 22, 1930
Serial No. 497,457

3 Claims. (Cl. 250—36)

My invention pertains in general to frequency multiplication systems and specifically relates to such a system employing a cathode ray tube.

One of the objects of my invention consists in providing simple means for multiplying the frequency of high frequency currents.

Another object of my invention comprises producing a frequency multiplication system employing a cathode ray tube having a plurality of external electrodes commonly connected to a resonant circuit.

A further object consists in producing a frequency multiplier in which an electronic discharge is deflected by means under control of an alternating current to periodically energize a resonant circuit at a frequency which is a multiple of the frequency of the alternating current.

I accomplish the above desirable objects in a novel frequency multiplier employing a cathode ray tube having a multiplicity of external electrodes arranged in an orbit so as to be successively energized by the cathode ray.

In the drawing I have schematically represented one embodiment of the frequency multiplier of my invention.

Referring to the drawing, I provide a cathode ray tube having a cathode 1 and an anode 2 disposed within an evacuated envelope 3. The envelope 3 can be composed of any suitable substance such as glass or fused quartz. The cathode 1 is connected to battery 4 and the anode 2 is connected through battery 5 to cathode 1. The anode 2 is provided with an aperture which permits the electronic discharge, or cathode ray, emitted from the cathode 1, and indicated by the dotted line 6, to be projected to the face 7 of the envelope 3. Such an arrangement comprises a normal type of cathode ray tube well known in the art.

Four electrodes 8, 9, 10, and 11 are mounted, insulated from each other, within the envelope 3 in a manner, as shown, to enclose the path of the cathode ray emerging from the anode 2. The electrodes 8 and 11 are directly connected to a source of alternating current 12, while the electrodes 9 and 10 are connected through the resistance 13 and the condenser 14 to the source of alternating current 12. This arrangement comprises a well known expedient for producing a revolving field from a source of alternating current. The revolving field so produced acts upon the cathode ray emerging from the anode 2 to cause the same to describe an orbit upon the face 7 of the envelope 3 as indicated by the dotted arrow 15. Arrangements similar to that shown for causing the deflection of a cathode ray have long been used in association with cathode ray tubes. Electromagnetic fields can also be used for deflecting cathode rays. If desired, means may be provided in my frequency multiplier system for producing an electromagnetic field to deflect the cathode ray instead of the means for producing an electrostatic field, here shown. It is to be understood that the exact arrangement for deflecting the cathode ray under control of an alternating current is well known in the art and does not constitute part of my invention.

For purposes of description I have arbitrarily chosen to represent an embodiment of my frequency multiplier in which an initial frequency of alternating current is multiplied by a factor of eight. However, as will be hereinafter pointed out, the system is adapted for producing any desired multiplication of an initial frequency. For eight-fold multiplication of the frequency of the initial alternating current, I provide eight electrodes 16, 17, 18, 19, 20, 21, 22, and 23 externally positioned on the face 7 of the envelope 3 and displaced from each other in the path described by the cathode ray by 45 angular degrees. These electrodes are composed of a metal such as nickel and are cemented upon the outer surface of the face 7 of the containing envelope 3. All of these electrodes are commonly connected to the grid 24 of a space discharge amplifier 25 having a plate 26 and filament 27. The filament 27 is connected through a source of suitable potential 28 to the cathode 1, while the plate 26 is connected through a resonant circuit, having inductance 29 and capacitance 30, to a source of high potential 31 and thence to the filament 27 of the space discharge amplifier 25. The inductance 29 is electromagnetically coupled to another inductance 32 which comprises a work circuit for the utilization of the multiplied high frequency current developed by my frequency multiplier system.

To produce frequency multiplication according to my system, alternating current is fed from the source 12 to electrodes 8, 9, 10, and 11 to produce a rotating field within the envelope 3. This rotating field causes the electronic discharge, or cathode ray, emerging through the anode 2 to describe an orbit upon the face 7 of the envelope 3. I have found in experiments that the cathode ray will induce a charge in an external electrode when the cathode ray impinges upon the envelope at a point immediately adjacent the external electrodes. As the cathode ray is moved to describe an orbit as indicated by the arrow 15, the electrodes 16, 17, 18, 19, 20, 21, 22 and 23 are successively energized. Since in the present embodiment of my invention the external electrodes are angularly displaced from each other by 45° it will be obvious that a time interval will elapse between the energization of each of the electrodes which will be equal to one-eighth of the time required for the cathode ray to describe an orbit. Inasmuch as one cycle of the alternating current from the source 12 is required to revolve the cathode ray once around its orbit, it is evident that the energization of the eight external electrodes on the face 7 of the envelope 3 will take place at time intervals displaced from each other by one-eighth of the time interval required for one cycle of the alternating current from the source 12. In other words, the grid 24 of the space discharge amplifier 25 will be energized eight times for every cycle of the alternating current from the source 12. These charges will then be amplified by the space discharge amplifier 25 and fed from the plate 26 to the resonant circuit 29—30. The values of the inductance 29 and capacitance 29—30 is eight times the frequency of the alternating current from the source 12. It will be apparent that the successive energization of the eight external electrodes disposed about the orbit 15 will produce charges upon the grid 24 which, acting through the resonant circuit 29—30, will produce an alternating current which has a frequency which is an eight-fold multiplication of the frequency from the source 12. This multiplied high frequency current can then be utilized through the work circuit 32 for any desired purpose such as for high frequency signaling.

It is an especial feature of my invention that the external electrodes can be affixed or arranged in a convenient manner without disturbing the internal functions of the cathode ray tube. For example, any number of electrodes can be provided to produce any desired frequency multiplication factor. Although I have shown a preferred embodiment of my frequency multiplier, its is, of course, to be understood that changes can be made therein without departing from the intended scope of my invention. I do not, therefore, desire to limit myself to the foregoing except insofar as may be pointed out in the appended claims.

What I claim as new and original and desire to secure by Letters Patent of the United States is:

1. A frequency multiplier comprising, an evacuated envelope of vitreous material, means for producing an electronic stream within said envelope, a plurality of electrons positioned on the exterior surface of said envelope, a source of alternating current, means under control of said alternating current, for moving said electronic stream in an orbit to successively energize said electrodes by electrostatic induction only, a single amplifier and a resonant circuit having inductance and capacitance connected through said amplifier to all of said electrodes.

2. A frequency multiplier comprising, an evacuated envelope of vitreous material, means for producing a cathode ray within said envelope, a plurality of electrodes positioned on the exterior surface of said envelope, a source of alternating current, means under control of said alternating current for moving said cathode ray in an orbit to successively energize said electrodes by electrostatic induction only, a thermionic amplifier having input and output circuits, said input circuit being connected to all of said electrodes and said output circuit containing a resonant circuit tuned to a frequency which is a multiple of the frequency of said alternating current.

3. A frequency multiplier comprising, an evacuated envelope of vitreous material, means for producing a cathode ray within said envelope, a plurality of electrodes positioned on the exterior surface of said envelope, a source of alternating current, means under control of said alternating current for moving said cathode ray in an orbit to successively energize said electrodes by electrostatic induction only, a thermionic amplifier having a control electrode, a cathode and an anode, said control electrode being connected to all of said plurality of electrodes, and a resonant circuit having inductance and capacitance and tuned to a frequency which is a multiple of the frequency of said alternating current connected between said anode and said cathode.

AUGUST HUND.